L. MANDEL.
MAGAZINE DEVELOPING CAMERA.
APPLICATION FILED JULY 7, 1908.
907,515.
Patented Dec. 22, 1908.
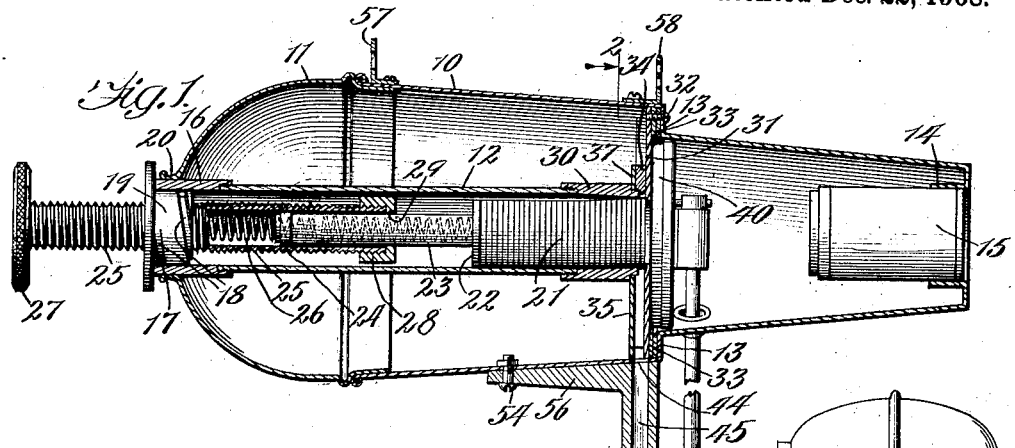
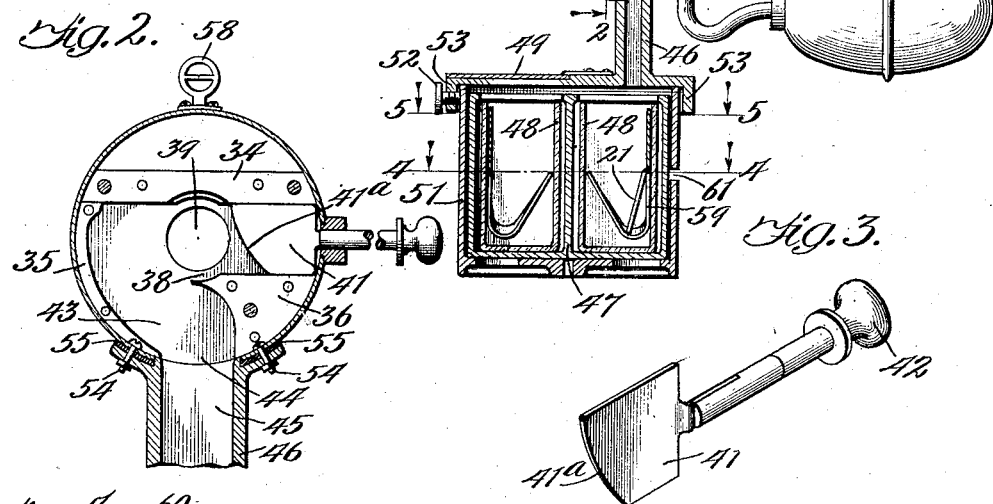
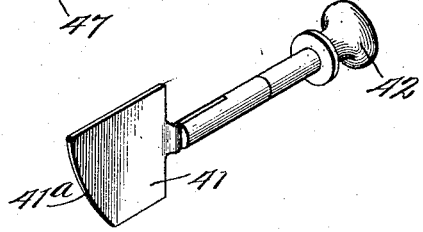
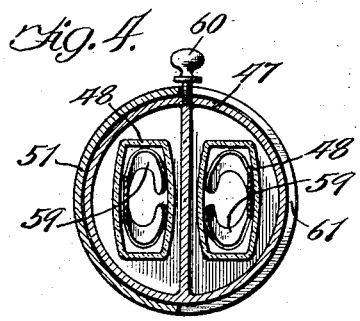
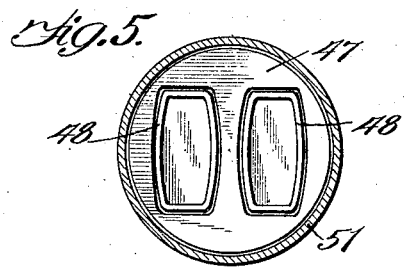
Witnesses:
Inventor:
Louis Mandel
By Brown & Hopkins
Attys

UNITED STATES PATENT OFFICE.

LOUIS MANDEL, OF CHICAGO, ILLINOIS.

MAGAZINE DEVELOPING-CAMERA.

No. 907,515.　　　　Specification of Letters Patent.　　　　Patented Dec. 22, 1908.

Application filed July 7, 1908. Serial No. 442,394.

*To all whom it may concern:*

Be it known that I, LOUIS MANDEL, a citizen of the United States, residing at Chicago, in the county of Cook and State of Illinois, have invented certain new and useful Improvements in Magazine Developing-Cameras, of which the following is a full, clear, and exact specification.

The invention relates to cameras and more particularly to that type of camera known as the magazine developing camera, so called because of their being provided with a magazine for carrying a plurality of sensitized plates, and also carrying means in conjunction or connection with the camera for developing the sensitized plates or other objects as fast as they are exposed.

The primary object of the present invention is to provide an improved camera of the class described which shall be simple and cheap in construction, efficient in operation and which at the same time is convenient in transportation and in use, and presenting at the same time a neat and attractive appearance.

A further object of the invention is to provide improved means in a camera of the class described for retaining the sensitized plates in the magazine under spring pressure.

A further object of the invention is to provide improved means in a magazine camera of the class described for properly centering or presenting the sensitized plates or other sensitized objects for exposure.

A further object of the invention is to provide improved means in a camera of the class described for discharging the sensitized plates or other objects from their position after exposure and conducting them to the means employed in developing and fixing them.

A further object of the invention is to provide an improved construction of casing for both the camera and the developing means.

A further object of the invention is to provide an improved casing for containing the magazine and the other elements adapted to coöperate in exposing the plates or objects carried within the magazine, such construction being of exceedingly simple design and adapted to permit the ready assembling and disassembling of the magazine and the shutter mechanism.

A further object of the invention is to provide an improved form of developing bath carrying means in a camera of the class described.

A still further object of the invention is to provide improved means for positioning or pointing the camera at objects.

To the attainment of these ends and the accomplishment of certain other new and useful objects, the invention consists in the features of novelty in construction, combination and arrangement of the several parts as hereinafter described and more specifically pointed out in the appended claims and shown in the accompanying drawing, forming a part of this specification.

In the said drawing—Figure 1 is a longitudinal sectional view of a camera embodying the invention. Fig. 2 is a sectional view taken on line 2—2, Fig. 1, looking in the direction of the arrows. Fig. 3 is a detail of a plunger for use in discharging the plates or objects from the magazine after exposure, shown also in Fig. 2; and Figs. 4 and 5 are sectional views through the bath carrying means, being taken on lines 4—4 and 5—5, respectively, of Fig. 1.

10 is the main body of the camera casing. It is preferably in the form of a frustum of a cone as illustrated, being approximately of largest diameter at the point where it joins the cap 11, which is approximately in the form of a hemisphere, being provided with a suitable opening for the introduction of a magazine tube 12. The body 10 is provided with an abrupt offset or collar at 13, where it will be seen the diameter is considerably reduced in order to furnish a suitable seat for the frame carrying the shutter and the means for discharging the plates or other objects carried in the magazine. Beyond the offset 13 at the forward end of the camera the body portion gradually diminishes, being smallest at the forward end where it is preferably provided with an opening surrounded by the inwardly extending flange 14, affording a seat for the lens 15. The tubular magazine 12 is preferably provided with thickened walls as at 16, in order to strengthen the end of the same and more particularly to make the same capable of supporting a suitable pin or lug 17, which projects inwardly and is adapted to take into the spiral slot 18 in the thumbnut 19, which fits loosely on the interior of the end 16 of the magazine tube; the magazine tube being supported by the outwardly flanged edges 20 of the body cap 11.

In Fig. 1 a plurality of sensitized plates or other objects is indicated at 21, the same being held normally under spring pressure at the forward end of the magazine tube by the follower 22, which has the rearwardly extending tube 23 attached rigidly thereto in any desired manner. The follower and the tube may be formed integral or united by screw-threading, soldering or other well-known means. On the end opposite the follower the tube 23 is provided with a collar 24 of somewhat larger diameter than the diameter of the tube and being adapted to fit so as to slide on the interior of the threaded tubular member 25. The member 25 like the member 23 may be tubular throughout its entire length, thus being adapted to receive the helical spring 26. At the outer end the threaded member 25 is provided with the knurled thumb-nut 27, and the threaded outer surface of this member is adapted to coöperate with corresponding internal threads in the thumb-nut 19. When these parts are assembled as shown in Fig. 1, the helical spring 26 being held under compression in the interior of the tube 23 and the threaded tubular member 25, these parts are held together by a suitable threaded collar 28 which is screw-threaded to correspond with the forward end of tubular member 25, and is provided with an inwardly extending flange portion as at 29, adapted to secure the threads together by abutting against the collar 24. By this construction it will be seen that tube 23 and the follower 22 secured thereto may move forward in relation to the tubular member 25 until collar 24 comes in contact with the inwardly extending flange on the collar 28. But the thumb-nut 19 being secured to the walls of the magazine tube, it will be seen that when the tubular member 25 is thrust forward by manipulating thumb-nut 27 tube 25 will be telescoped over tube 23 and the spring 26 compressed. By this improved construction any desired amount of spring pressure may be imparted to the follower by adjusting the thumb-nut 27. The construction is also an exceedingly practical one, easily assembled, and no difficulty is experienced in removing the spring-pressed follower in order to replenish the sensitized plates or objects within the magazine as would be experienced were the helical spring 26 not completely inclosed.

The magazine tube 12 is preferably of slightly larger diameter than the diameter of the sensitized plates or other objects 21, in order that they may freely slide throughout the length of the tube. Heretofore in the use of a magazine tube larger than the diameter of the plates or objects it has been found that it is difficult to properly position the plate at the moment of exposure. In order that the sensitized plates 21 may be inserted in the magazine without being injured by exposure to light, it is common to incase them within a tube. The spring follower 22 and the mechanism operating it as described are then removed from the magazine and the tube containing the sensitized plates inserted. The plates may then be pushed out of the tube and the tube withdrawn, after which the spring-pressed follower will then be inserted in the magazine. These tubes containing the sensitized plates must necessarily be of some thickness and therefore it is necessary that the interior diameter of the magazine tube 12 be somewhat larger than the diameter of the plates themselves. Heretofore it has been found that the plates are likely to be improperly centered at the moment of exposure with reference to the lens or the shutter which often results in serious defects in the quality of the resulting picture. In order to provide against this difficulty the forward end of the tube 12 of the magazine is provided with the short section of thickened tube 30 conical in shape on its interior and being of least diameter at its extreme forward end where it is designed to be of a diameter only slightly larger than the diameter of the plates, thus insuring that they be properly centered at the moment of exposure.

31 is a plate approximately circular in form, being adapted to register with the walls of the main body of the frame adjacent the shoulder portions 13 formed by the sudden contraction of the main casing as described. This plate is secured to the portion 13 of the casing by any suitable means as screws 32, and in order that a light-proof joint may be formed one or more thicknesses of some suitable packing material, as illustrated at 33, may be inserted between this plate and the wall 13. On the rear or magazine side of plate 31 a suitable housing is provided, adapted to form a beginning of the slot or runway through which the plates 21 are to be discharged from the mechanism after exposure. This housing is provided by first securing to the magazine side of plate 31 members, as 34, 35 and 36 of suitable thickness, and over these members is secured the plate 37. The forward contracted end 30 of the magazine registers with and is secured to plate 37, so that the tendency of the spring-pressed follower 22 is to crowd the plates into the housing 38 between plates 31 and 37. Plate 31 is provided with an opening, as at 39, being of less diameter than the diameter of the plates or objects, but being at the same time an opening sufficient to admit of their proper exposure.

In Fig. 1, 40 represents the casing of a shutter of any desired form secured to the forward side of plate 31, and operable in any desired manner as by the familiar bulb and tube mechanism as shown.

In Fig. 2, housing 38 is shown provided with a plunger 41 operable from the exterior of the casing as by handle 42. It will be apparent that with plunger 41 in the position illustrated in Fig. 2 the action of spring-pressed follower 22 on the plates would result in crowding the forward plate against plate 31 and retaining it in that position. After exposure, a single plate may be discharged into the runway by pushing the plunger 41 inwardly, since the thickness of the plunger, the thickness of the housing and that of the plates or other objects are about the same the plate will be crowded from behind the column held by the spring-pressed follower 22 and will be allowed to drop against member 35 and into the runway 43. The discharge of the plate into the runway is further facilitated by the shape given to the forward edge of plunger 41 as illustrated at 41ª, as it will be seen that its angular shape would have a tendency to crowd the plate downwardly, the latter by gravity passing through the opening 44 in the bottom of the casing and into the slot 45 in the neck portion 46, this last mentioned slot also forming a part of the runway leading to the developing bath-containing means. The runway 45 is adapted to discharge into a suitable receptacle 47, provided with a plurality of bath holding receptacles 48. In the embodiment of the invention shown, there are two of these bath receptacles, so disposed that when one of them is in register with the runway 45 the other will be accessible through the hinged lid 49 secured to the extension 50 at the lower end of the neck 46, which forms a top cover for the casing adapted to surround the revoluble vessel 47. The remainder of this casing is indicated by the reference character 51, being secured to the top plate 50 by screws 52 in the depending peripheral flange 53 on the top plate 50. To the depending member or neck 46 provided with the runway slot leading to the bath receptacle, is secured casing member 10 by suitable bolts 54, and in order to secure a joint that will exclude the light a suitable packing member as 55 may be used. In order to make the fastening between the casing 10 and the neck member secure a branch as 56 may be cast integrally with the neck member and allowed to extend as illustrated in Fig. 1 toward the magazine end of the camera along the under side of the casing 10. In the present embodiment of the invention the form of casing illustrated while serviceable and compact is at the same time of an ornamental character, following in general outline the shape of large field guns or cannons.

In order that the camera may be properly positioned with reference to objects desired to be photographed, suitable finding means as the sights 57 and 58 are provided, being situated some distance apart on the upper side of the casing and secured thereto in any desired manner as by the screws shown. The sights 57 and 58 not only serve as a simple and efficient finding means, but they are also very cheap and not liable to get out of order.

From the foregoing description the operation of the device will be fully apparent, and it will be seen that when the magazine is loaded with the sensitized plates or other objects 21 they may be exposed consecutively, beginning with the forward plate, and after exposure each single plate may be discharged by the operator, who manipulates the plunger 41 through the handle 42 on the exterior of the casing, thus delivering the plates or objects into the runway and thence to the bath receptacle which happens to be immediately under the runway. The bath receptacle 48 may be provided with any suitable developing and fixing material. In Fig. 1 of the drawing one of the plates 21 is shown within the bath receptacle immediately under the runway resting upon a suitable removable holder 59, which is provided with an upwardly extending branch adapted to be seized by the operator for lifting the plate from the bath receptacle after developing. It will be apparent that as soon as the plate has been exposed and discharged into the bath receptacle, the pivotally mounted bath carrying vessel 47 may be rotated on its vertical axis 180 degrees which will change the positions of the bath carrying receptacles 48, thus putting the one containing the plate being acted upon by the developer underneath the removable lid 49, to enable the operator to remove the plate when desired. The other bath carrying vessel will then be in position below the runway 45 to receive the next incoming plate. In order to provide for the rotation of the bath carrying vessel 47 on its vertical axis it is provided with the member 60, which protrudes through a slot in the wall of the casing member 51, which slot is designated by reference character 61, and extends around approximately 180 degrees of the circumference of the casing, thus permitting the rotation of the bath carrying vessel 180 degrees, as stated.

In order that the invention might be fully understood, the details of the preferred embodiment thereof have been thus specifically described; but

What I claim is:

1. In a camera of the class described, the combination of a tubular magazine, comprising a tubular portion of approximately uniform diameter and a portion adjacent the forward end thereof comprising a section of tubing provided with an internal opening in the form of a frustum of a cone, and having its smallest diameter at the extreme forward end of the magazine.

2. In a camera of the class described, the combination of a tubular magazine, a spring follower within the magazine, a runway communicating with the magazine at its forward end, means for discharging the plates from the magazine into the runway, and means for centering the plates at the forward end of the magazine for exposure, said means comprising a contracted forward end of said tubular magazine in the form of the frustum of a cone and having its smallest diameter at the extreme forward end.

3. In a camera of the class described, in combination, a tubular magazine, means at its forward end for discharging the plates, a spring follower, a tubular member secured to the rear of the follower, a follower spring within the said tubular member, and a screw-threaded tubular member at the rear of the follower, being adapted to telescope with the said tubular member of the follower, whereby the follower spring may be entirely inclosed and the tension thereof adjusted.

4. In a camera of the class described, in combination, a tubular magazine, means at its forward end for discharging the plates, a spring follower, a rearward extension on the follower, a tubular member adapted to telescope over the rearward extension on the follower, a follower spring within the tubular member, and means for adjusting the tubular member, whereby the tension of the follower spring may be adjusted.

5. In a camera of the class described, in combination, a tubular magazine, means at its forward end for discharging the plates, a spring follower, a tubular member secured to the rear of the follower, and being provided with a stop on the exterior surface thereof adjacent its rearward extremity, a screw-threaded tubular member at the rear of the follower, being adapted to telescope over the said tubular member of the follower and the said stop thereon, a helical spring on the interior of said follower tube and the said screw-threaded tubular member, and a collar removably secured to the forward end of the screw-threaded tubular member and being provided with means for engaging the stop on the said tubular member of the follower.

6. In a camera of the class described, in combination, a main casing, a plate magazine within the casing, a runway communicating with the magazine, means for discharging a plate from the magazine into the runway, a depending neck secured to the casing, there being a runway or slot in the neck communicating with the main casing, and a bath receptacle at the lower extremity of the neck.

7. In a camera of the class described, in combination, a main casing, a bath casing, a plate magazine within the main casing, a runway communicating with the magazine, means for discharging plates from the magazine into the runway, a neck secured at its upper extremity to the main casing and at its lower extremity to the bath casing, there being a runway or slot in the neck communicating with the neck in the runway within the main casing, a pivotal bath carrying element within the bath casing, a bath receptacle carried by the said pivotal element, and means operable from the exterior of the bath casing for causing the said bath receptacle to register with the runway at the lower extremity of the neck.

8. In a camera of the class described, in combination, a main casing, a bath casing, a neck connecting the said main and bath casings and being provided with a runway as a means of communication from the main casing to the bath casing, a pivoted bath carrying element within the bath casing, a plurality of bath receptacles carried by the said pivoted element, a slot in the wall of said casing, and a member secured to the said pivotal element and extending through the said slot to the exterior of the casing.

9. In a camera of the class described, the combination of a main casing, a bath casing, a neck connecting the said casings, there being a runway in the said neck providing a means of communication from the said main casing to the bath casing, a magazine within the main casing, means for discharging plates from the said magazine in the said bath casing through said runway in the neck, a pivotal bath carrying element in the bath casing, a plurality of bath receptacles, means for operating the said pivotal element within the casing, comprising an arm secured thereto and extending through a slot in the wall of the casing, and a door on the upper side of the bath casing adapted to afford access to a bath receptacle not in register with the runway in the said neck.

10. In a camera of the class described, in combination, a casing comprising a main body portion of approximately circular form in cross section, being in the form of the frustum of a cone with its maximum diameter adjacent its rear end, a cap of approximately hemispherical form adapted to close the rear end of the casing, a peripheral shoulder formed around the main body portion at its forward end by a sudden contraction of the diameter of the casing, and a forward extension to the casing comprising a tubular portion in the form of the frustum of a cone having its smallest diameter at the extreme forward end of the casing, a plate magazine supported at its rear end by the said hemispherical cap of the main body portion, and at its forward end supported by a member secured to the said peripheral shoulder at the forward end of the main body portion, a runway at the forward end of the magazine, and means for discharging the plates into the said runway.

11. In a camera of the class described, in combination, a main casing comprising a main body portion of approximately tubular form having at its forward extremity a peripheral shoulder formed by a sudden contraction of the diameter of the said casing, and a forward extension of the casing beyond the said shoulder of gradually diminishing diameter toward its forward extremity, a magazine of approximately tubular form within the main body portion, being supported at its forward end by a plate secured to the said peripheral shoulder of the main body portion, means for discharging plates from the forward end of the tubular magazine comprising a plunger of approximately the thickness of the individual plates and being provided at its forward extremity with an angular portion adapted to depress the plates upon being discharged from the tubular member, a downwardly extending runway communicating with the forward end of the magazine, and a bath receptacle at the lower extremity of the runway.

In testimony whereof I have signed my name to this specification, in the presence of two subscribing witnesses, on this 29th day of June A. D. 1908.

LOUIS MANDEL.

Witnesses:
J. H. JOCHUM, Jr.,
C. H. SEEM.